US00RE34785E

United States Patent [19]

Virey

[11] E Patent Number: Re. 34,785

[45] Reissued Date of Patent: Nov. 15, 1994

[54] PROCESS FOR LUBRICATING A SURFACE SUCH AS A MOULD FOR THE MANUFACTURE OF A GLASS OBJECT

[75] Inventor: Franck Virey, Le Vallois Perret, France

[73] Assignee: L'Air Liquide, Societe Anonyme Pour L'Etude et L'Exploitation des Procedes Georges Claude, Paris, France

[21] Appl. No.: 652,579

[22] PCT Filed: Mar. 13, 1987

[86] PCT No.: PCT/FR87/00071

§ 371 Date: Oct. 19, 1987

§ 102(e) Date: Oct. 19, 1987

[87] PCT Pub. No.: WO87/05595

PCT Pub. Date: Sep. 24, 1987

Related U.S. Patent Documents

Reissue of:

[64] Patent No.: 4,806,137
Issued: Feb. 21, 1989
Appl. No.: 110,214
Filed: Mar. 13, 1987

[30] Foreign Application Priority Data

Mar. 17, 1986 [FR] France ..... 86 03733

[51] Int. Cl.[5] ..... C03B 9/48

[52] U.S. Cl. ..... 65/26; 65/24; 65/170; 106/38.2; 264/338; 184/6.14

[58] Field of Search ..... 65/24, 26, 169, 170, 65/25.1, 60.3, 60.6; 106/38.2, 38.28; 184/6.21, 6.22, 6.14; 264/338; 423/458

[56] References Cited

U.S. PATENT DOCUMENTS

| | | | |
|---|---|---|---|
| 3,453,084 | 7/1969 | Ivernel . | |
| 3,649,206 | 3/1972 | Ivernel . | |
| 4,119,513 | 10/1978 | Shum | 204/428 |
| 4,333,756 | 6/1982 | Seeman . | |
| 4,408,903 | 10/1983 | Baldasarri | 72/13 |
| 4,412,974 | 11/1983 | Nicolas | 422/156 |
| 4,498,918 | 2/1985 | Seeman | 65/26 |
| 4,526,600 | 7/1985 | Myers | 65/26 |
| 4,648,893 | 9/1985 | Roux | 65/169 |

FOREIGN PATENT DOCUMENTS

| | | | |
|---|---|---|---|
| 2460312 | 7/1979 | France | 65/26 |
| 2570364 | 3/1986 | France . | |
| 86541 | 3/1985 | Germany . | |
| 0135537 | 8/1984 | WIPO . | |

*Primary Examiner*—Joye L. Woodard
*Attorney, Agent, or Firm*—Curtis, Morris & Safford

[57] ABSTRACT

Process for lubricating a surface for the manufacture of a glass object, in which a layer of lubricant is periodically deposited on the surface.

This layer of lubricant is produced with the aid of a source of heat such as an oxyfuel flame having a temperature higher than 2000° K. through which there is injected during a given period of time a gaseous hydrocarbon or a mixture of gaseous hydrocarbons comprising at least 15% of a constituent in respect of which the ratio [fo] *of* the number [oc] *of* carbon atoms to the number of hydrogen atoms C/H is higher than 0.75. The rate of injection of the hydrocarbon through the flame and the temperature of the latter are controlled in such manner as to obtain a porous layer of carbonaceous particles capable of burning in the air when they are deposited on the glass object when the latter is still hot.

23 Claims, No Drawings

PROCESS FOR LUBRICATING A SURFACE SUCH AS A MOULD FOR THE MANUFACTURE OF A GLASS OBJECT

Matter enclosed in heavy brackets [ ] appears in the original patent but forms no part of this reissue specification; matter printed in italics indicates the additions made by reissue.

BACKGROUND OF THE INVENTION

The present invention relates to a process for lubricating a surface such as a mould, a conveyor belt, etc., for the manufacture of a glass article such as a receptacle, in which there is periodically deposited a layer of lubricant on the surface. The manufacture of glass objects, in particular hollow glass objects such as bottles, flasks, etc. . . . is usually carried out in accordance with two methods:

The first method, termed "blown-blown", in which a blank is formed by blowing in a first mould, this blank being then transferred to a second mould in which it is blown so as to assume its final shape.

The second method, termed, "pressed-blown", in which a blank is formed by pressing a drop of glass or parison issuing from a hopper in a mould, this blank being then transferred to a blowing mould in which the hollow blank is blown so as to assume its final shape.

Flat glass objects are usually produced by pressing.

Irrespective of the method employed, the internal walls of the moulds in which the blanks are formed are regularly lubricated to permit an improved penetration of the glass and avoid [cetain] *certain* surface defects of the blank, which defects subsist on the finished receptacle. The technique still frequently employed at the present time in glassworks is a technique involving the manual lubrication of the moulds, which is not without danger for the handlers. This lubrication is usually carried out with an oil containing graphite in suspension.

In such a manual method, the operator has a tendency to deposit a large quantity of oil so as to reduce the frequency of the lubrications. This results in a soiling of the first blanks produced after each lubrication and considerably increases the losses in the manufacturing line. Further, a large amount of smoke in the working area is created.

It has been for a long time attempted to substitute for the manual lubrication an automatic lubrication in manufacturing lines of glass receptacles, without much success up to the present time.

French Pat. No. 1,285,586 discloses an automatic lubricating process for a closed mould in which the moulding apparatus is provided with lubricating passageways through which oil is injected into the mould before introducing the parison in the latter.

The introduction of oil by a manual or automatic process results in a great local pollution, since the oil burns upon contact with the moulds and gives off a thick black smoke charged with polyaromatic hydrocarbons. Now this pollution is found on the glass articles, the latter being coated with residues of incomplete combustion of the oil which do not burn in the air notwithstanding the high temperature at which the blank leaves the mould, which in practice forbids the lubrication before each introduction of a parison. If this lubrication is not effected before each introduction, there is a rapid decrease in the pollution but a corresponding increase in the surface defects of the glass article.

A solution has been proposed in U.S. Pat. No. 4,165,974 which comprises coating the internal surface of the moulds with a carbon fluoride so as to produce an anti-adherent layer on this surface. This process necessiates the disassembly of each mould, the treating thereof, and then its submission to a heat treatment before placing it back on the machine. Although the mentioned duration of lubrication is several hours, such a process requires a practically permanent human presence around the manufacturing machine with the obligation to frequently stop this machine for disassembling the moulds, lubricating them, remounting them, etc., which results in prohibitive manufacturing costs.

U.S. Pat. No. 4,409,010 discloses a process for lubricating moulds by a spaying of liquid oil onto the internal surfaces of the moulds, but the disclosed process does not avoid the drawbacks relating to the use of oil for the lubrication.

There is also another problem when using one of the processes described hereinbefore: when the glass receptacles leave the mould without a trace of greasy pollution, their surface state is usually poor, it of course depending on the quality of the surface of the steel mould. Although this quality is monitored, the receptacles usually have, when leaving the manufacturing line, a mat appearance of the "orange peel" type which is unsatisfactory to the client. This is why the applicant has developed a process for polishing the surface of glass [artivles] *articles* disclosed in the European Pat. No. 136,934 whereby it is possible to give a shiny surface appearance to these articles. Such a process, which is particularly required when producing receptacles of high quality, for example in the perfumery field, necessarily increases the manufacturing costs and it is at the present time desired, for the manufacturer of glass bottles or receptacles in respect of which the surface quality requirements are less strict, to obtain directly from the mould, a receptacle whose surface state is acceptable to the client.

U.S. Pat. No. 4,412,974 discloses a process for producing carbon black in which an acetylene jet is cracked in an air or oxy-fuel flame. This process has numerous applications. One consists in depositing a layer of carbon black on the walls of a mould, this layer having high lubricating and insulating qualities. Such a process is applicable in the glass-making field in particular for insulation against thermal and mechanical shocks of belts transferring glass objects issuing from the moulding machine and traveling for example to the machine for effecting a surface polishing with the flame mentioned above. In this way, harmful thermal and/or mechanical shocks of the glass receptacles leaving the moulds are avoided owing to the insulating properties of the produced carbon deposit.

It has however been found that by using the process disclosed in U.S. Pat. No. 4,412,974 for producing glass receptacles, results were obtained which were substantially equivalent to those obtained with the previously described techniques: the deposits of carbonaceous material usually permit a good lubrication but have the drawback of rapidly soiling the moulds and producing greasy deposits on the surface of the glass article, as in the case of the use of oil. No improvement on the surface state of the receptacle leaving the mould was found however relative to processes for greasing the imprints of the mould. On the other hand, it has been found, as described in French Pat. No. 25 70 364, that the use of the [proces] *process* disclosed in U.S. Pat. No. 4,412,974, enabled the blank moulds to be correctly lubricated during their normal period of opening so that any adherence of the parison to the walls of the mould is avoided.

SUMMARY OF THE INVENTION

In a completely surprising manner, the process according to the invention permits in particular, when lubricating the moulds, the obtainment of a carbonaceous deposit which gives a skin quality to the glass which is very distinctly superior to that of the known processes and does not necessarily require a surface treatment of the receptacle when it leaves the mould.

The process according to the invention is characterized in that the layer of lubricant is produced by means of a source of heat of a temperature exceeding 2000° K., through which there is injected for a predetermined period of time a gaseous [hydrocargon] *hydrocarbon* or mixture of a gaseous hydrocarbons comprising at least 15% of a constituent in respect of which the ratio of the number of carbon atoms to the number of hydrogen atoms C/H is higher than 0.75, the rate of injection of the hydrocarbon through the flame and the temperature of the latter being controlled in such manner as to obtain a porous layer of carbonaceous particles, which when they are deposited on the glass article whose external skin is at a temperature higher than about 500° C., are capable of burning in air.

DESCRIPTION OF CERTAIN PREFERRED EBMODIMENTS

According to a perferred manner of proceeding, the source of heat is an oxygen-fuel flame having an oxygen factor of higher than 1.

The applicant believes, that, without this explanation limiting the scope of this invention, the use of a superstoichiometric] *ichiometric* flame, i.e. having an excess of oxygen relative to the [stoechiometric] *stoichiometric* amount, permits the avoidance of the cracking of the fuel which is responsible for the presence of greasy particles. Further, the regulation of the oxygen factor, i.e. the ratio of the quantity by volume of oxygen in the flame employed and in the [stoechiometric] *stoichiometric* flame under the normal conditions of temperature and pressure, permits acting on the temperature of the flame, the latter having a tendency to decrease when the oxygen factor increases. [IOn] *In* any case, it is therefore necessary to take care that the temperature of the flame remains higher than 2000° K., and preferably higher than 2500° K. The carbonaceous deposit obtained is thus a porous layer which, after compression by the parison in the mould is slightly thermally insulating, which permits a uniform cooling of the skin of the glass receptacle by a cooling of the mould, but sufficiently thermally insulating to avoid a temperature gradient in the glass which would produce internal tension in the walls of the receptacle, thus rendering it more fragile. Now, it is known that the quality of the skin of the receptacle obtained form the mould has an influence on the resistance of the receptacle to pressure. This parameter is very important for receptacles containing in particular gassy drinks. The process according to the invention permits, by the improvement in the quality of the skin of the receptacle directly issuing from the mould, an increase in the resistance to pressure of the receptacle of about 25% or even more, which is considerable. In some applications, this enables the thickness of the glass wall to be decreased for a given strength.

The carbonaceous deposit obtained also has a very important feature in practice since it is found that it burns in the air when it is deposited on the glass blank: in this way, the finished receptacles have no traces of pollution, which considerably improves the manufacturing outputs. Further, the moulds may be simply cleaned with a cloth if this is necessary.

A considerable advantage of the invention is that it permits the use of moulds which have been subjected to no polishing or lacquering on their internal surfaces, which operations are very expensive. The receptacles obtained from such non-polished moulds lubricated in accordance with the invention have indeed a skin quality higher than that of receptacles obtained from polished or lacquered moulds provided with a layer of lubricant according to the prior art.

Further, this usually results in a prolonged life of the moulds.

As a source of heat capable of producing a temperature higher than or equal to 2000° K., an oxyacetylene flame is preferably employed. However, any source of heat having a temperature higher than 2000° K. is suitable, such as plasma.

Owing to the short period of injection of the hydrocarbon which, in the case of acetylene, for example, does not exceed a second, no drop of glass is deviated from the mould to permit the lubrication: this lubrication can be carried out between the extraction of the blank and the pouring of a new drop of glass.

Among the hydrocarbons suitable for producing a powdered carbonaceous material by a thermal cracking there may be chosen, alone or in a mixture, acetylene, propyne, [propadiene,] benzene, acetylene-ethylene mixtures consisting of propyne, [propadiene,] benzene, acetylene-ethylene mixtures, the mixtures formed by propyne, propadiene, propylene, and other $C_3$ or $C_4$ hydrocarbons, such as butadiene, butene,, propane. The mixtures containing at least 15% acetylene are suitable for carrying out the invention: there may be mentioned the acetylene-ethylene mixtures, in particular the mixtures sold under the commercial trademark, "Crylene" containing about 20% acetylene by volume and 80% ethylene by volume. The mixtures known under the trademark "Tetrene" consisting of propyne, propydiene, propylene, butadiene, butene, propane, in the proportion of 20 to 25% propyne by volume, 15 to 20% propydiene, 45 to 60% propylene by volume, 2 to 5% butadiene by volume, 2 to 5% butene by volume, 5 to 8% propane by volume, may also be suitable.

Acetylene will preferably be used when the available period of time for lubricating the mold is less than about a second. Generally, tests may be carried out with different hydrocarbons so as to determine if the available period of time is sufficient to obtain a layer having good properties. When hydrocarbons of the "Crylene" or "Tetrene" type are used, it will be preferable to have a flame whose temperature is higher than 2200° K., and to slow down their rate of injection relative to the acetylene. One skilled in the art will determine the optimum conditions by simple routine measures.

The carbonaceous material obtained on the walls before the dropping of the parison into the mould is constituted by [agregates] *aggregates* of spherules of very small diameter, between 5 and 50 nm, and more generally between 10 and 25 nm. These particles are visibly disordered and are not like any known structure in carbonaceous materials such as graphite, etc. However, the macrostructures are of the type having filaments whose length is 0.5 to 5 μm, and whose diameter is 0.1 to 0.5 μm which appear in a haphazard manner. The whole forms an extremely powdered deposit having a very great apparent porosity (before the dropping of the parison) of 90 to 90% and preferably 95 to 98%. The thickness of the film in particular depends on the duration of the injection of the hydrocarbon and it is possible to obtain, for example on a metallic surface, deposits of 1 to 50 μm thickness. Chemically, the spherical particles all have the characteristics of soot formed by carbonisation in a gaseous phase. They are therefore formed by solid carbon on which are more or less adsorbed various hydrocarbons, such as polyaromatic hydrocarbons which may or may not contain heteroatoms—O,H, S . . . On the whole, the fraction of carbon by weight is higher than 0.99.

According to a modification of the invention, it is quite possible to lubricate not the internal walls of the mould, before the dropping of the parison into the latter, but the parison itself before it drops into the mould.

According to another modification of the invention, the surface to be lubricated will be the conveyor belt for the glass object when the latter leaves the mould and is conveyed to another station of the machine for another manufacturing step (reheating, etc.). As the glass object is still hot during this transfer (temperature usually higher than about 500° C.), the same improvements are obtained as in the region of the mould, i.e. the absence of a greasy deposit and the maintenance of an excellent surface state.

A better understanding of the invention will be had from the following examples of carrying out the invention:

EXAMPLE 1

The flame is produced with an oxygen-natural gas mixture whose oxygen factor is equal to 1.35. The flame is directed in a direction parallel to the axis of the moulds and the lubrication is carried out when the mould is closed, between the ejection of the preceding blank and the introduction of a new drop of glass. The ventilation is stopped during the lubrication. An impulsion of acetylene occurs every n cycles of manufacture with $5<n<10$; the duration of each impulsion is 0.8 second, the corresponding rate of flow is equal to about 600 ml with a rate of injection of the acetylene into the flame on the order of 240 m/s.

Each blank produced is then blown into the form of a bottle. The bottles produced in this way are compared with those obtained under the same conditions but with the use of graphitized oil for lubricating the imprints of the mould according to the conventional technique.

There is found a distinct improvement in the quality of the skin of the bottle, which is shown by a much more brilliant appearance of the latter as it leaves the mould, and an increase in the resistance to pressure of the bottle which is in the mean higher by 25% (in a batch of 10 bottles) for the bottles obtained according to the process of the invention.

EXAMPLE 2

An oxygen-propane mixture is used whose oxygen factor is equal to 1.2. The impulsion of acetylene occurs every n cycles of manufacture: with $5<n<10$; the duration of each impulsion is 0.75 second, the corresponding rate of flow is equal to about 450 ml, the rate of injection of the acetylene is on the order of 170 m/s. The lubrication is carried out when the mould is open in accordance with the teaching of French Pat. No. 25 70 364. The ventilation for cooling the moulds is preferably cut off during the lubrication.

The same improvements as before are obtained as concerns both the quality of the skin and the resistance to pressure.

EXAMPLE 3

This example shows the improvement obtained in respect of the transferring conveyor located on the output side of the I.S. machine.

An oxygen-[ntural]*natural* gas flame is [sused] *used* whose oxygen factor is equal to 1.1. A curtain of flames (one flame about every 8 mm) evenly spaced apart, perpendicular to the conveyor (about 170 mm above the latter) and about throughout the width of the latter is employed with an injection of acetylene through openings halfway between the flames (also every 8 mm).

The conveyor belt to be treated measures 120 mm in width and travels through one complete path every 40 seconds. It is located at the entrance of the reheating arch and receives the bottles from a "machine" conveyor belt disposed at 90° and travelling slightly faster. The conveyor belt to be treated *is* of 2 meter in width and 7 meters in length, having metallic [meshed] *meshes*; transports 12,000 bottles per hour of the "Bordeaux wine" type. It is lubricated (dressed) completely about every half hour. For this [prupose] *purpose* there is used a continuous rate of flow of about 1 cu. m/hr of acetylene for 40 seconds.

As compared to a conveyor belt which has not been dressed, there is found a distinct decrease in the thermal shocks, microabrasions on the neck of the bottle, and an improved sliding on the transfer conveyor belt (improved alignment of the bottles). An improvement in the pressure performance of the bottles is also noted. Moreover, there is practically a total absence of greasy deposit on the surface of the bottle, which avoids rejects in the course of manufacture.

The invention is generally applicable to the lubrication of any surface, such as a mould, a conveyor belt, etc. for contact with hollow or flat glass objects whose temperature is still sufficiently high to cause abrasions, scratching, or deformation under the conditions (in particular mechanical conditions) under which the glass object comes in contact with said surface.

I claim:

1. A process for providing a lubrication layer on a [mold] surface *of an object which contacts an article*, in which the layer of lubricant is periodically deposited onto the surface, the process comprising [maintaining the temperature of the surface at least about 500° C. as the lubricant is deposited thereon,] producing said layer of lubricant by [a] *an oxygen-fuel superstoichiometric* flame having a temperature higher than 2000° K. *and an oxygen factor greater than 1,* and injecting a gaseous hydrocarbon through the flame for a given period of time, the gaseous hydrocarbon comprising at least 15% of a constituent in respect of which the ratio of the number of the carbon atoms to the number of hydrogen atoms C/H is higher than 0.75, the rate of injection of the hydrocarbon through the flame and the temperature of the flame being controlled in such manner as to obtain a porous layer of carbonaceous particles capable of burning in [the] air when they are [deposited on the] *transferred onto a* surface *of the article* when the [surface] temperature *of the article* is equal to at least about 500° C.[, the particles adhering to the surface].

2. A process for lubricating a [mould] *surface* according to claim 1, the temperature of the flame being higher than 2500° K.

[3. A process for lubricating a surface according to claim 1 or 2, the flame comprising an oxygen-fuel superstoechrometric flame having an oxygen factor higher than 1.]

4. A process for lubricating a surface according to claim [3] *1*, the [gaseous hydrocarbon] *flame* having an oxygen factor of [the] between 1.1 and 1.4.

5. A process for lubricating a surface according to claim 1, in which the hydrocarbon contains at least 15% of a constituent in respect of which the ratio of the number of carbon atoms to the number of hydrogen atoms C/H is equal to at least 1.

6. A process for lubricating a surface according to claim 1, in which the hydrocarbon is chosen from the group consisting of acetylene, propyne, [propadiene,] benzene, acetylene-ethylene mixtures, mixtures constituted by propyne-propadiene-propylene and other $C_3$ and $C_4$ hydrocarbons.

7. A process for lubricating a surface according to claim 1, in which the hydrocarbon is an acetylene-ethylene mixture in a ratio of about 20% acetylene by volume and 80% ethylene by volume, the temperature of the flame being higher than 2200° K.

8. A process for lubricating a surface according to claim 1, in which successive quantities of the gaseous hydrocarbon are injected through the flame, each said quantity being between 0.4 and 0.8 liter.

9. A process for lubricating a surface according to claim 1, the apparent porosity of the layer of particles [before the dropping] being between about 90% and 98% [and preferably between 95% and 98%].

10. A process for lubricating a surface according to claim 1, the porous layer of particles being formed by aggregates of spherules having a diameter of between 5 and 50 nanometers and macrostructures having filaments whose length is between 0.5 and 5 [m] *μm* and whose diameter is between 0.1 and 0.5 [m] *μm*.

*11. A method of lubricating a surface of an object, in which there is periodically deposited on said surface a layer of lubricant containing carbonaceous particles produced from a gaseous hydrocarbon, comprising the steps of injecting said hydrocarbon for a given period of time through a flame of a temperature higher than 2000° K. produced by combustion of a mixture of hydrocarbon and oxygen, said flame having an oxygen factor greater than 1 and said injected hydrocarbon comprising at least 15% of a constituent of which the ratio of the number of carbon atoms to the number of hydrogen atoms (C/H) is greater than 0.75; and controlling the rate of injection of the hydrocarbon through the flame and the temperature of said flame to obtain a porous layer of carbonaceous particles.*

*12. A method of lubricating a surface according to claim 11, wherein the temperature of said flame is higher than 2500° K.*

*13. A method of lubricating a surface according to claim 11 wherein the oxygen factor of said flame is between 1.1 and 1.4.*

*14. A method of lubricating a surface according to claim 11 wherein the ratio C/H is at least equal to 1.*

*15. A method of lubricating a surface according to claim 11 wherein the hydrocarbon injected through the flame is selected from the group consisting of acetylene, propyne, benzene, acetylene-ethylene mixtures, mixtures made up from propyne-propadiene-propylene and other $C_3$ and $C_4$ hydrocarbons.*

*16. A method of lubricating a surface according to claim 11 wherein the hydrocarbon injected through the flame is an acetylene-ethylene mixture at a ratio of approximately 20% by volume of acetylene and 80% by volume of ethylene, and wherein the temperature of the flame is higher than 2,200° K.*

*17. A method of lubricating a surface according to claim 11 wherein successive quantities of hydrocarbon are injected through the flame, each said quantity being between 0.4 and 0.8 litre.*

*18. A method of lubricating a surface according to claim 11 wherein the apparent porosity of the layer of carbonaceous particles deposited on said surface is between approximately 90% and 98%.*

*19. A method of lubricating a surface according to claim 11 wherein the porous layer of carbonaceous particles is formed by aggregations of spherules of a diameter between 5 and 50 nanometers and macrostructures having filaments of a length between 0.5 and 5 μm and a diameter between 0.1 and 0.5 μm.*

*20. A method of lubricating a surface according to claim 11 wherein the hydrocarbon is injected at a rate on the order of 170 m/s to 240 m/s.*

*21. A method of lubricating a surface according to claim 11 wherein said surface is a mold for the production of a glass object.*

*22. A method of lubricating a surface according to claim 11 wherein said surface is the surface of a conveyor belt.*

*23. A method of lubricating a surface according to claim 22, wherein the step of injecting comprises injecting said hydrocarbon through a plurality of flames.*

*24. A method according to claim 23 wherein the flames form a curtain, are evenly distributed and are directed perpendicularly to said conveyor belt.*

* * * * *